April 5, 1932.  R. W. BAYLEY  1,851,971
VALVE SEATER
Filed April 5, 1930
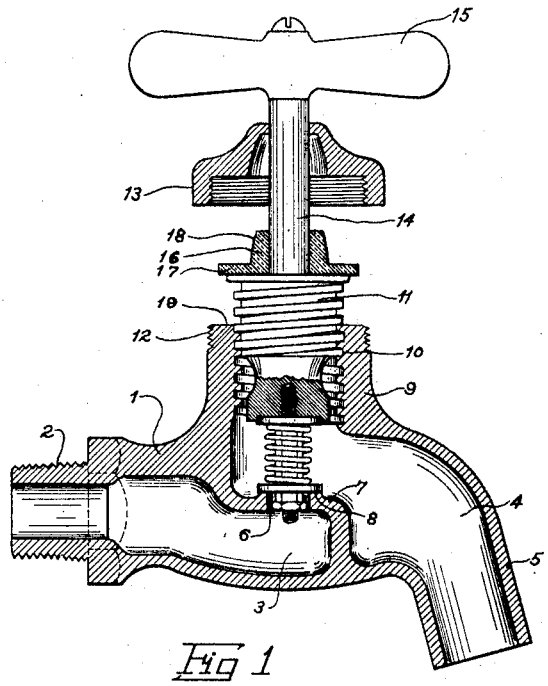
Fig 1
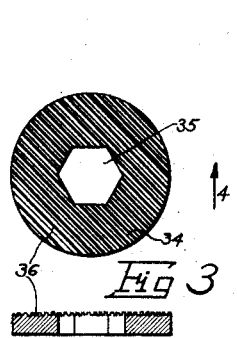
Fig 3
Fig 4
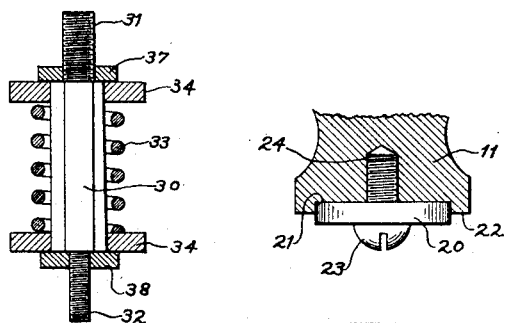
Fig 2
Fig 5
INVENTOR.
Richard W. Bayley.
BY
Slough and Canfield
ATTORNEY.

Patented Apr. 5, 1932

1,851,971

UNITED STATES PATENT OFFICE

RICHARD W. BAYLEY, OF ELYRIA, OHIO

VALVE SEATER

Application filed April 5, 1930. Serial No. 441,912.

This invention relates to valves and particularly to means for seating or reseating the sealing surfaces thereof.

As is well known, valves, for example valves of the faucet type, after they have been in use for some time, begin to leak, due to the development of imperfections, scratches and the like on the sealing surfaces thereof.

It thereupon becomes necessary to replace the faucet entirely or to grind, lap or otherwise refinish the sealing surfaces. Heretofore, this has involved considerable expense, either for labor or for apparatus.

It is one of the objects of this invention to provide means whereby the sealing surfaces of a valve may be quickly and easily and cheaply refinished or reseated to restore the same to perfect sealing condition after wear thereof.

Another object is to provide a device for reseating valves which may be applied to and operated by the valve elements supplied with the valve.

Another object is to provide a valve seating tool for valves of the type having a rotary element for operating the valve adapted to be secured to and operated by the rotary valve element.

Another object is to provide as an article of manufacture a simple and cheap tool adapted to be carried in stock in hardware stores or the like and purchased by the valve user and which may be quickly and easily attached to a movable element of the valve structure and employed to reseat the valve by movement of the movable valve element.

Another object is to provide a tool adapted to be attached to the movable valve element of a valve structure for reseating the sealing surfaces of the valve, and which may be provided with means for securing it to valve elements of variable standardized dimensions.

Other objects will be apparent to those skilled in the art to which my invention pertains.

My invention is fully disclosed in the following description taken in connection with the accompanying drawings in which:—

Fig. 1 is a cross-sectional elevational view of a valve of the faucet type with my invention applied thereto;

Fig. 2 is a view to a larger scale of a valve reseating tool proper which I may employ, shown in Fig. 1;

Fig. 3 is a plan view of a circular file element forming part of the device in Fig. 2 in its preferred form;

Fig. 4 is a sectional view taken from the plane 4 of Fig. 3;

Fig. 5 is a fragmentary view of a part of Fig. 1 illustrating a valve sealing element in place of which the tool of Fig. 2 may be applied to the valve structure for reseating the same.

Referring to the drawings, I have shown at 1 a main valve housing provided with external screw threads 2 by which it may be fitted to the plumbing system. The casing 1 has an inlet conduit 3 therein and a discharge conduit 4 terminating in a spout 5. The inlet and discharge conduits 3 and 4 are connected by a preferably circular port 6 in a substantially horizontal web 7. The port 6 is surrounding or encircled by a vertically projecting annular bead 8 on the upper surface of the web 7.

The casing is provided with an upwardly extending neck 9 internally threaded as at 10 to receive a threaded head 11. The neck 9 is externally threaded as at 12 to receive a packing nut 13. The head 11 terminates upwardly in a shank or stem 14 secured thereto and passing through a suitable perforation in the nut 13 and finally terminating in a valve handle 15. A packing element 16 having a flange 17 and a cone-shaped collar 18 is provided surrounding the shank 14.

The parts above described are shown in their relative positions when the valve reseating operation is being performed. In the normal operation of the valve, the head 11 is screwed into the neck 9 by turning the handle 15 and shank 14 until the flange 17 rests upon the upper extremity 19 of the neck 9; and the nut 13 is screwed on the threads 12 to clamp the packing 17 between the neck 9 and nut 13 and to compress the collar 18 of the packing around the shank 14 in a well known manner to seal the shank 14 rotatably with respect to the neck 9.

In normal operation, the head 11 has on its lower extremity, as shown in Fig. 3, a circular valve washer 20 of fibre, leather or like material seated in a circular seat 21 in a transverse face 22 on the head 11. The washer 20 is secured on the head 11 by a screw 23 passing through the washer 20 and threaded into the head 11 as at 24.

Furthermore, in normal operation, the handle 15 of the valve is turned and the head 11 is screwed downwardly until the washer 20 sealingly engages the bead 8 on the web 7 to seal the same. After continued use, the bead 8, however perfectly it may be initially formed in the process of manufacture, becomes pitted, scratched or otherwise worn, causing leakage to occur between the washer 20 and the bead 8. To reseat or refinish the bead 8 or correct leakage, the tool, which will now be described, and which constitutes an essential part of my invention is employed.

Referring to Fig. 2, I show the reseating tool proper comprising a hexagonal body 30 axially elongated and provided on its upper and lower extreme ends with screw threaded portions 31 and 32. Telescoped with the body 30 is a helical compression spring 33, the axial extremities of which abut upon file elements 34—34. One of the file elements 34 is shown separately, in Figs. 3 and 4, and is generally of circular disk form provided at its center with a hexagonal perforation 35 adapted to slidably fit on the hexagonal body 30. The file element 34 is preferably produced by a well known method of manufacture by which files for filing metal are made and is thus provided on one or on both faces thereof with cutting or filing teeth, edges, serrations or the like 36. The cutting filing edges 36 are shown only on one side of the element 34 in the drawings, but it will be understood that they may be provided on both sides, and in use the file elements 34 may be removed and turned over to bring one or the other faces thereof to use in a manner that will be understood hereinafter.

Nuts 37 and 38 are provided on the threaded portions 31 and 32 to retain the body 30, spring 33, and file elements 34 in assembled unitary relation, pending the use or operation of the seating tool proper, which will now be described.

To reseat the valve, the nut 13 is first removed and thereafter the handle 15 is turned to unscrew the head 11 and entirely remove the same from the housing 1. The screw 23 and valve washer 20 are then removed. The nut 37 is then correspondingly removed from the seating tool proper, and the threaded portion 31 thereof is screwed into the threads 24 in the head 11, vacated by the screw 23 and the file element 34 thus takes the place vacated by the washer 20. The head 11, with the reseating tool thus secured thereto is reinserted into the housing 1 and the head 11 screwed inwardly until the lower file element 34 engages the bead 8.

Upon screwing the head 11 inwardly beyond this position, pressure is applied between the file element 34 and the bead 8 and the file element 34 is rotated. By oscillatorily revolving the head 11, the file element 34 will perform a filing operation back and forth upon the bead 8 and accurately finish and reseat the same. During this operation, the inwardly and outwardly screwing of the head 11 is compensated for by the compression and expansion of the spring 33 and also the spring 33 concurrently maintains the file element 34 firmly on the bead 8. The hexagonal fitting between the body 30 and file element 34 enables the body to drive the filing element and force it to perform the filing operation.

The diameter of the file elements 34 are preferably substantially the same as the diameter of the valve washer 20 so that the filing element may seat itself in the seat 21 of the head 11; and the engagement of the file surface of the file element 34 with the seat 21 will cause the head 11 to grip the file element, so that it will not unscrew with threads 24 when the head 11 is rotated.

Preferably the file edges 36 are rectilinear and parallel and thus as the disk form file rotates on its axis, the direction of movement of the file edges of the bead 8 continually changes, the relative movement on the file at one number, being transversely of the cutting edges 36 and at another time at an acute angle thereto, so that the cutting of grooves or lines in the bead 8 is avoided and a very smooth planular surface is filed thereon, the filing action being as a matter of fact, superior to that produced by a file as ordinarily used in ordinary filing operations. The head may now be removed and the seating tool detached therefrom and the washer 20 and screw 23 replaced.

In common commercial practice, the threads 24 in the head 11 are generally provided in two standardized sizes and to adapt the tool to these sizes, the threaded portion 31 is made of one size and the threaded portion 32 is made of the other size so that either end of the tool may be used as found necessary or desirable.

It will also be apparent that the file elements may be removed from the tool and turned over to employ the opposite faces thereof or interchanged end for end on the device simply by removing one or the other or both of the nuts 37 and 38.

The tool is very simple and cheap to construct and is adapted to be carried in stock in hardware stores and may be purchased at a very small cost by the householder or other user of the faucet or other type of valve, and he may thus at little cost reseat his own valves. The file element 34 may similarly be carried separately in hardware stock and dispensed to renew and prolong the usefulness of the seating tool.

My invention is not limited to the exact details of construction shown and described inasmuch as many changes and modifications thereof may be made within the scope of my invention.

I claim:

1. In a tool for reseating valves of the type comprising a valve seat, a rotary valve element adapted to be rotated and screw threadedly propelled towards the valve seat, and a valve seat washer on the valve element and a holding screw for holding the same thereon, a noncircular longitudinally elongated body portion, a screw threaded shank at each end of the body portion, a shoulder at the base of each shank, a nut on each shank overlapping the shoulder, a cutter of disc form at each end of the body portion, provided with a perforation enclosing the body portion and of form corresponding to that of the body portion to prevent rotation thereon, but permit longitudinal movement thereon, and a compression spring surrounding the body portion and abutting at opposite ends upon the cutters to resiliently hold the latter against the nuts, the shanks being of different thread characteristics and each adapted, upon removal of its nut, to be screwed into a valve element to replace the holding screw thereof and to clamp the corresponding shoulder upon the valve in place of the washer.

2. The combination with a rotary valve element of the type adapted to be rotated and screw-threadedly propelled toward a valve seat and normally comprising a valve seat washer and a holding screw for holding the same thereon, of a valve reseating tool element comprising a non-circular longitudinally elongated body portion, a screw-threaded shank at each end of the body portion, the shanks being of different thread characteristics, a shoulder at the base of each shank, a cutter of disc form at each end of the body portion provided with a perforation enclosing the body portion and of form corresponding to that of the body portion to prevent rotation thereon but permit longitudinal movement thereon, a nut on one shank overlapping the shoulder, the other shank being screw-threaded into the rotary valve element to replace the holding screw thereof and to clamp the corresponding shoulder of the body portion upon the rotary valve element in place of the washer, and a compression spring surrounding the body portion and abutting at opposite ends upon the cutters.

In testimony whereof I hereunto affix my signature this 2nd day of April, 1930.

RICHARD W. BAYLEY.